United States Patent
Kreile

(10) Patent No.: US 6,199,897 B1
(45) Date of Patent: Mar. 13, 2001

(54) AIRBAG COVER

(75) Inventor: Holger Kreile, Elsenfeld (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/190,088

(22) Filed: Nov. 12, 1998

(30) Foreign Application Priority Data

Nov. 13, 1997 (DE) .......................................... 297 20 138 U

(51) Int. Cl.⁷ ..................................................... B60R 21/16
(52) U.S. Cl. .......................................... 280/728.3; 280/732
(58) Field of Search .............................. 280/728.3, 731, 280/732, 728.1

(56) References Cited

U.S. PATENT DOCUMENTS

| | | | |
|---|---|---|---|
| 5,577,767 | * 11/1996 | Nemoto | 280/731 |
| 5,772,240 | * 6/1998 | Vavalidis | 280/728.3 |
| 5,786,049 | * 7/1998 | Nusshor | 428/35.2 |
| 5,803,489 | * 9/1998 | Nusshor | 280/728.3 |

FOREIGN PATENT DOCUMENTS

| | | |
|---|---|---|
| 4344523 | 7/1995 | (DE) . |
| 0749872 | 12/1996 | (EP) . |
| 04015145 | 1/1992 | (JP) . |
| 10095292 | 4/1998 | (JP) . |
| 9425312 | 11/1994 | (WO) . |
| 9703866 | 2/1997 | (WO) . |

* cited by examiner

*Primary Examiner*—Christopher P. Ellis
*Assistant Examiner*—Rashmi Sharma
(74) *Attorney, Agent, or Firm*—Tarolli, Sundheim, Covell, Tummino & Szabo L.L.P.

(57) ABSTRACT

An airbag cover for an airbag unit in a motor vehicle is adapted to be torn open along predetermined lines on sudden inflation of the airbag to swing open in one or more parts along hinge lines. The cover is composed of two or more layers. A full-length tear line intended as a predetermined breaking line is provided only in the first layer on the side of the airbag.

1 Claim, 2 Drawing Sheets

AIRBAG COVER

The present invention relates to an airbag cover which closes an exit opening of an airbag unit in a motor vehicle.

Usually, such covers are visually and haptically adapted to their installation surrounding. Insofar as a driver airbag is concerned, the cover has to be matched to the surface structure and colour of the steering wheel sheating. Front passenger airbags are arranged below the instrument panel so that the surface of the cover has to correspond with the surface of the instrument panel as far as possible. The situation is similar for side airbags and all other airbags to be installed in motor vehicles.

It can easily be understood that adapting the cover to its installation surrounding often poses great problems, because the latter possibly consists of materials which are not or only partly suitable for manufacturing a cover. Typical covers are therefore configured normally with two or more layers, the internal layer being provided with the required structural strength, whereas the outer layer is taylored so as to adapt to the installation surrounding. In most cases, the cover is a part of a separate airbag module which is designed for the installation on a steering wheel, an instrument panel or other internal parts of a car body. In these cases, the cover is often designated as "cover cap", the circumferential edge of which is adapted to the size of the installation opening and the tear area of which, in contrast, is smaller.

An airbag cover may constitute an integral component of an instrument panel or of another internal part for motor vehicle bodies, where the adaptation to the installation surrounding generally poses no problems, but wherein the exact positioning of the tear line and the dimensioning of the predetermined breaking lines with respect to their strength can become difficult.

Hitherto it is assumed that, in the case of airbag covers configured in two or more layers, the tear lines intended as predetermined breaking lines have to be arranged in all layers such that they have the same length and coincide with each other, so that a defined resistance to tearing can be reproducibly realized within narrow limits, because in this respect one cannot accept an incalculable hindrance on the sudden deployment of the airbag. This, however, can be achieved in the case of covers configured in two or more layers only with significant production expenses, because for producing the individual layers separate operating steps are required and, mostly, also separate form tools.

The present invention provides an airbag cover which can be produced at a far more favorable price, without posing the need of accepting incalculable resistances on the sudden inflation of the airbag along predetermined lines.

According to the invention, an airbag cover is provided which consists of two or more layers, a full-length tear line intended as a predetermined breaking line being provided only in a first one layer of these layers.

Tests have surprisingly brought the result that there is no need for a full-length tear line in the second layer and that the second layer in fact tears open independently of the tear line predefined in the first layer when the airbag is inflated. The dynamic forces during the tearing process obviously are of more importance than the static tensile strength so that any resistances to tearing hardly play a role when the first layer is torn open under the influence of the gas pressure wave acting in the airbag. Therefore, it is sufficient to configure a tear line intended as a predetermined breaking line in the second layer, which tear line is shorter than that of the first layer. Furthermore, it has been found that it is sufficient to configure the tear line of the second layer so as to be at least partially coincident with the tear line of the first layer.

Further details of the invention are explained more clearly with reference to the embodiments illustrated in the FIGS. 1 and 2, in which.

Figure 1:
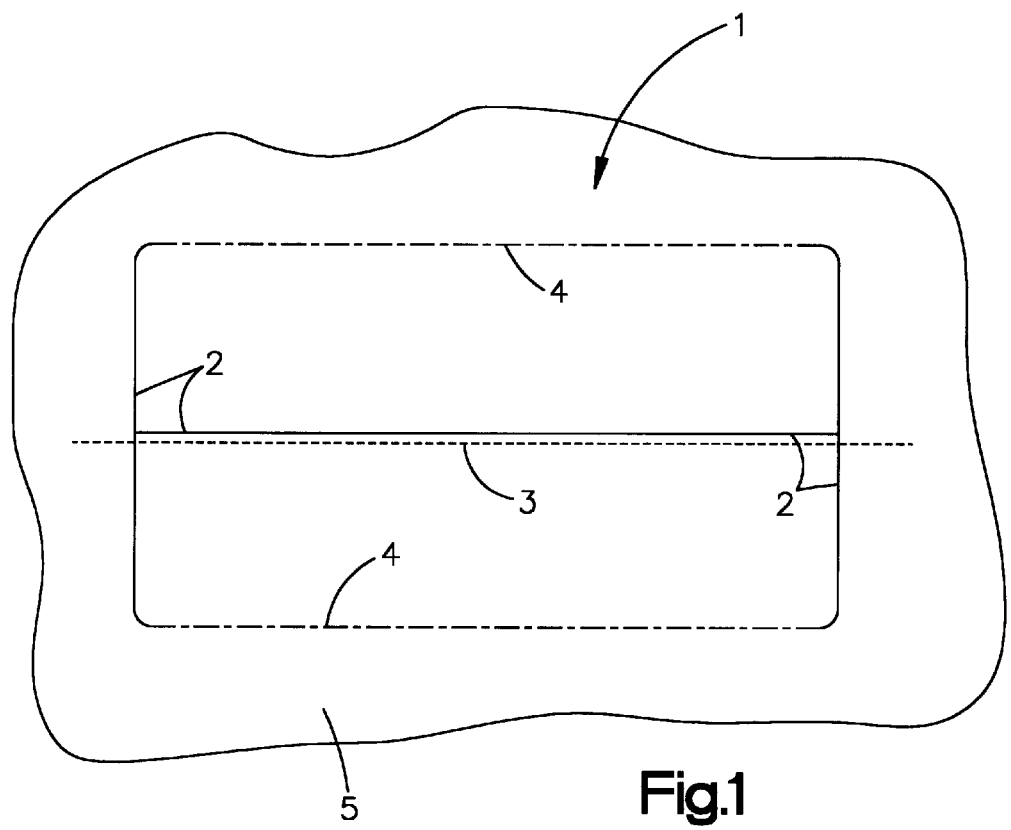
FIG. 1 shows a first embodiment of the invention in a plan view.

In FIG. 1 there is illustrated a cut-out 5 of an installation surrounding of an airbag cover 1, which for example could be part of an instrument panel. The airbag cover 1 is configured in two layers, a full-length tear line 2 being configured in the first layer and completed by bending lines 4. On inflation of the airbag (not shown), the cover 1 tears open at first along the horizontally extending part of the tear line 2 and then along the vertically extending lines adjoining thereto at the right and the left so that the upper and the lower part of the cover 1 can swing open about the bending or hinge lines 4. The tear line 3 of the second layer is configured only along the horizontal extent of the tear line 2 in the first layer and is extended so as to protrude at its ends beyond the vertical line portions by a specific length. It has been found that a tear line 3 configured in such a way is absolutely sufficient for ensuring a perfect tearing process. It can easily be understood that it is much simpler during production to configure the tear line 3 in the second layer so as to be coincident with the horizontally extending part only of tear line 2 in the first layer, as if during production additionally also the vertically extending sections had to be adapted to each other with respect to their dimensions.

Figure 2:
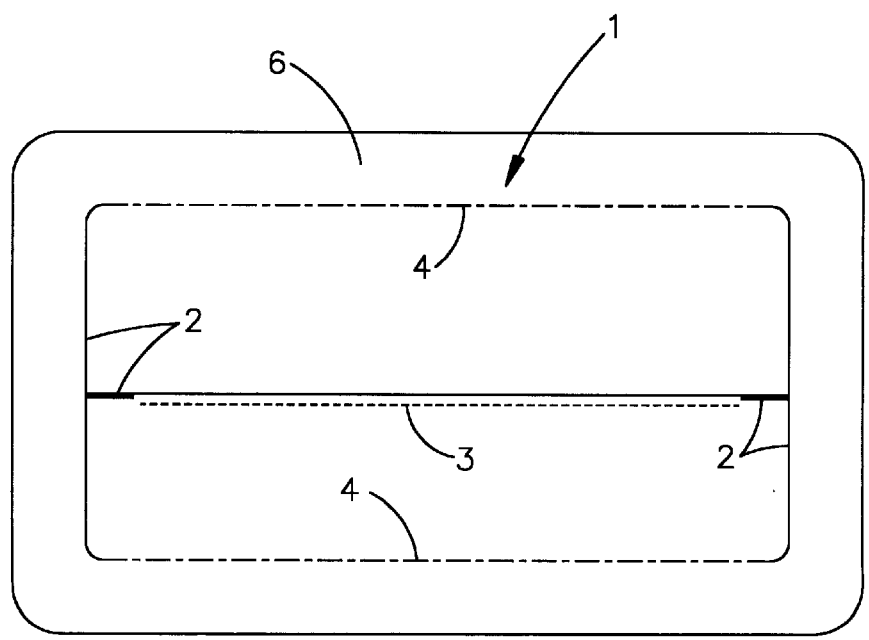
FIG. 2 shows a second embodiment of the invention and likewise in a plan view.
Figure 3:
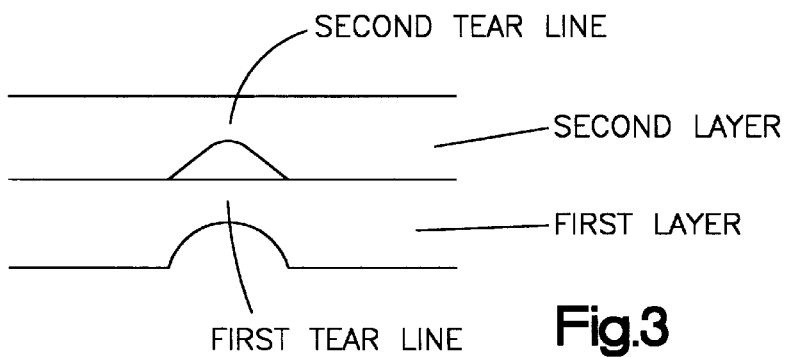
FIGS. 3–5 show further embodiments of the invention.

In FIG. 2 an airbag cap referenced by 6 is a component of an airbag module which is installed in an installation surrounding, for example, in the steering wheel or instrument panel of a motor vehicle. The cover 1 is a part of the airbag cap 6 and has in the first layer a tear line 2 intended as a predetermined breaking line which is arranged like in the embodiment according to FIG. 1. The predetermined breaking line 3 in the second layer is configured so as to correspond only with the horizontal extent of the tear line 2 of the first layer, and is also configured only along part of its length. Here, too, the upper and lower parts of the cover 1 swing open about bending or hinge lines 4. Even such a tear line 3 in the second layer can be sufficient, because the dynamic forces on the sudden inflation of the airbag are, as has been proved, sufficient to cause the further tearing of the second layer along any lines as predefined by the tear lines in the first layer.

It should be noted that the extension of the tear lines 2 and 3 as well as of the bending lines 4 is only schematically depicted in the FIGS. 1 and 2 and that these lines are not visible or perceptible, at least at the surface facing the passenger compartment.

Figure 4:
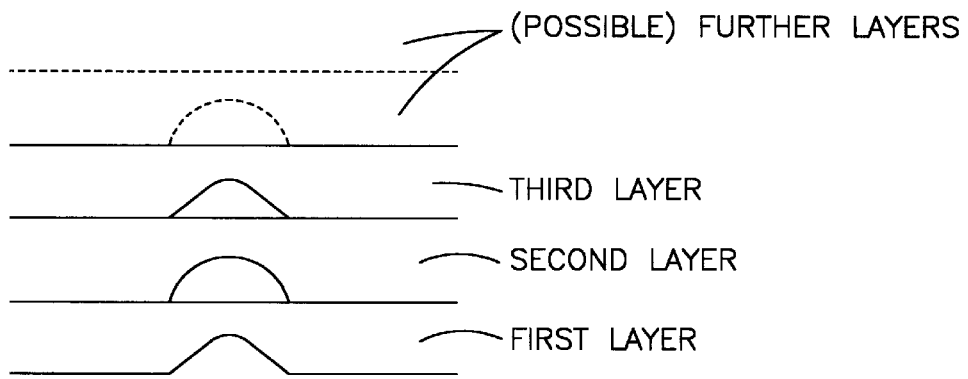
Figure 5:
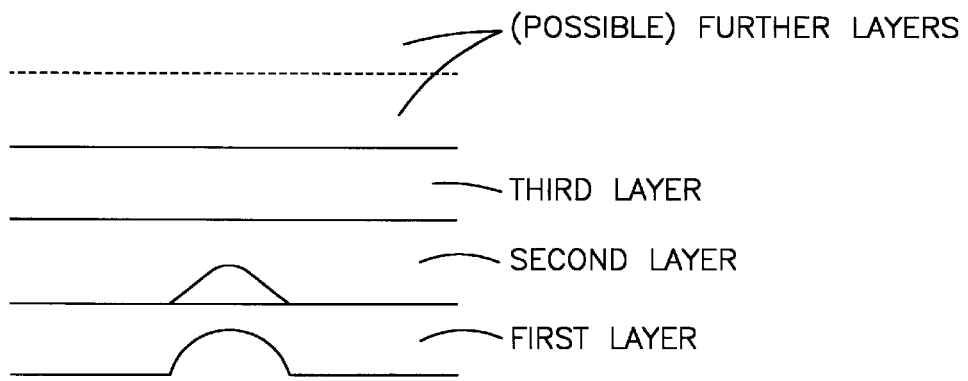

The first layer of the cover is located internally adjoining the airbag. In another embodiment, the second layer consists essentially of the same material as an upper layer of an installation surrounding the cover. In a further embodiment, as shown in FIG. 5, a third layer of the cover and each of any further layers have no predetermined breaking line. In yet another embodiment (FIG. 4), the third layer of the cover and each of any further layers of the cover have a predetermined breaking line which is not longer than the predetermined breaking line in the second layer.

What is claimed is:

1. A cover for an exit opening of an airbag unit in a motor vehicle, said cover comprising tear lines along which said cover is torn open and at least one hinge line along which said cover swings open upon sudden inflation of said airbag so that at least one door opening is formed, said cover being formed of at least two layers, a first one of said layers having a first tear line and a second one of said layers having a second tear line, only said first tear line defining said door opening in said cover, a third one of said layers and each of any further layers having a tear line which is not longer than said second tear line.

* * * * *